(12) United States Patent
Medwed et al.

(10) Patent No.: US 12,265,626 B2
(45) Date of Patent: Apr. 1, 2025

(54) APPARATUSES AND METHODS WITH SECURE CONFIGURATION UPDATE

(71) Applicant: NXP B.V., Eindhoven (NL)

(72) Inventors: Marcel Medwed, Graz (AT);
Ventzislav Nikov, Haasrode (BE);
Tobias Schneider, Graz (AT)

(73) Assignee: NXP B.V., Eindhoven (NL)

( * ) Notice: Subject to any disclaimer, the term of this patent is extended or adjusted under 35 U.S.C. 154(b) by 503 days.

(21) Appl. No.: 17/830,197

(22) Filed: Jun. 1, 2022

(65) Prior Publication Data

US 2023/0395110 A1  Dec. 7, 2023

(51) Int. Cl.
| | |
|---|---|
| *G06F 21/57* | (2013.01) |
| *G06F 8/65* | (2018.01) |
| *G11C 13/00* | (2006.01) |
| *G11C 16/10* | (2006.01) |

(52) U.S. Cl.
CPC ............. *G06F 21/575* (2013.01); *G06F 8/65* (2013.01); *G06F 21/572* (2013.01); *G11C 13/0059* (2013.01); *G11C 16/105* (2013.01)

(58) Field of Classification Search
CPC ............ G06F 11/1433; G06F 11/1417; G06F 11/1448; G06F 21/57; G06F 21/572; G06F 21/575; G06F 21/71; G06F 21/74; G06F 8/65; G11C 13/0059; G11C 16/105
See application file for complete search history.

(56) References Cited

U.S. PATENT DOCUMENTS

| | | | |
|---|---|---|---|
| 7,555,775 | B2 | 6/2009 | Smith |
| 7,900,249 | B2 | 3/2011 | Burcham et al. |
| 8,359,646 | B2 | 1/2013 | Suffern et al. |
| 8,489,922 | B2 | 7/2013 | Matthew |
| 8,839,435 | B1 | 9/2014 | King |

(Continued)

FOREIGN PATENT DOCUMENTS

| | | | | |
|---|---|---|---|---|
| EP | 0999673 | B1 | 6/2004 | |
| EP | 3444720 | B1 * | 2/2020 | ............... G06F 8/65 |

(Continued)

OTHER PUBLICATIONS

Yao, Jiewen, and Vincent Zimmer. "Building secure firmware." Apress: New York, NY, USA (2020): 67-184. (Year: 2020).*

(Continued)

*Primary Examiner* — Michael Simitoski

(57) ABSTRACT

One example securely updates an integrated circuit to mitigate undesirable modifications and this involves an application circuit accessing an external network while a (e.g., nonvolatile) program memory is write protected; and a reset-boot circuit resetting and booting the application circuit while access to the external network is disabled, and causing an update for the application circuit. In response to an indication that an update is downloaded for installation, the downloaded update is installed in the memory while access to the external network is disabled, and execution of the reset mode is permitted after the update is installed. Also, a retrieval module may download, in response to an indication that an update is not downloaded, an update provided via the external network while the memory is write-protected and thereby permitting execution of the reset mode after the update is downloaded.

20 Claims, 4 Drawing Sheets

(56) References Cited

U.S. PATENT DOCUMENTS

| | | | |
|---|---|---|---|
| 8,869,138 | B2 | 10/2014 | Bandakka |
| 8,892,928 | B2 | 11/2014 | Maciocco |
| 8,909,930 | B2 | 12/2014 | Winslow et al. |
| 9,300,642 | B2 | 3/2016 | Weis et al. |
| 9,722,904 | B2 | 8/2017 | Liu et al. |
| 10,680,887 | B2 | 6/2020 | Pallas et al. |
| 10,809,944 | B1 | 10/2020 | Ostrikov et al. |
| 2003/0084337 | A1 | 5/2003 | Simionescu et al. |
| 2004/0076043 | A1 | 4/2004 | Boals et al. |
| 2004/0255167 | A1 | 12/2004 | Knight |
| 2004/0268116 | A1 | 12/2004 | Vasisht |
| 2005/0055595 | A1* | 3/2005 | Frazer ............... G06F 8/654 713/400 |
| 2005/0132179 | A1* | 6/2005 | Glaum ............. G06F 11/1433 713/1 |
| 2007/0002730 | A1 | 1/2007 | Lu et al. |
| 2007/0050426 | A1* | 3/2007 | Dubal ................. G06F 8/65 |
| 2007/0118646 | A1* | 5/2007 | Gassoway ........... H04L 67/34 709/225 |
| 2007/0150524 | A1* | 6/2007 | Eker .................. G06F 8/658 707/999.203 |
| 2009/0006827 | A1* | 1/2009 | Rothman ......... G06F 11/1441 713/1 |
| 2010/0082932 | A1* | 4/2010 | Rothman ............. G06F 8/65 711/E12.001 |
| 2010/0180130 | A1 | 7/2010 | Stahl et al. |
| 2010/0191950 | A1 | 7/2010 | Lin et al. |
| 2010/0248707 | A1 | 9/2010 | Hoffner et al. |
| 2013/0097711 | A1 | 4/2013 | Basavapatna et al. |
| 2013/0276128 | A1* | 10/2013 | Konetski ............. G06F 21/10 726/26 |
| 2014/0250290 | A1 | 9/2014 | Stahl et al. |
| 2014/0310510 | A1 | 10/2014 | Potlapally et al. |
| 2015/0067402 | A1 | 3/2015 | Lee et al. |
| 2015/0381651 | A1 | 12/2015 | Lietz et al. |
| 2016/0070656 | A1* | 3/2016 | Babu ................ G06F 3/0619 711/163 |
| 2016/0110550 | A1 | 4/2016 | Kakii |
| 2017/0032126 | A1* | 2/2017 | Koike ................ G06F 8/656 |
| 2017/0310703 | A1 | 10/2017 | Ackerman et al. |
| 2018/0019880 | A1 | 1/2018 | Wu et al. |
| 2018/0096154 | A1* | 4/2018 | Shivanna ........... G06F 21/572 |
| 2018/0165455 | A1 | 6/2018 | Liguori et al. |
| 2019/0349356 | A1 | 11/2019 | McElwee et al. |
| 2020/0034541 | A1* | 1/2020 | Ballard .............. G06F 8/654 |
| 2020/0184089 | A1 | 6/2020 | Ponsini |
| 2020/0210204 | A1* | 7/2020 | Arora ............... G06F 9/4408 |
| 2020/0257518 | A1* | 8/2020 | Liedtke ............... G06F 8/65 |
| 2020/0305000 | A1 | 9/2020 | Obaidi |
| 2021/0133362 | A1 | 5/2021 | Medwed et al. |
| 2023/0198775 | A1* | 6/2023 | Liu .................. G06F 21/572 |
| 2024/0311489 | A1* | 9/2024 | Jin ................... H04L 9/3247 |

FOREIGN PATENT DOCUMENTS

| | | | | |
|---|---|---|---|---|
| TW | | 200428196 A | 12/2004 | |
| WO | | 2013188830 A1 | 12/2013 | |
| WO | | 2016020640 A1 | 2/2016 | |
| WO | | 20160999839 A1 | 6/2016 | |
| WO | WO-2020172061 A1 * | | 8/2020 | ............ G06F 11/004 |

OTHER PUBLICATIONS

Yao, Jiewen, and Vincent Zimmer. "A Tour Beyond BIOS-Capsule Update and Recovery in EDK II." Intel whitepaper (2016). (Year: 2016).*

Cooper, David, et al. "BIOS protection guidelines." NIST Special Publication 800.2011 (2011). (Year: 2011).*

Mahmoud Ammar and Bruno Crispo, Verify&Revive: Secure detection and recovery of compromised low-end embedded devices, ACSAC '20: Annual Computer Security Applications Conference, Virtual Event / Austin, TX, USA, Dec. 7-11, 2020, ACM, 2020, pp. 717-732.

TCG CyRes Working Group, Cyber Resilient Module and Building Block Requirements: Specification. Version 1.0, Rev. 0.08, Cyber Resilient Technologies, Oct. 19, 2020, 67 pgs. https://trustedcomputinggroup.org/work-groups/cyber-resilient-technologies/.

Manuel Huber, Stefan Hristozov, Simon Ott, Vasil Sarafov, and Marcus Peinado, The Lazarus Effect: Healing Compromised Devices in the Internet of Small Things, Asia CCS '20: The 15th ACM Asia Conference on Computer and Communications Security, Taipei, Taiwan, Oct. 5-9, 2020 (Hung-Min Sun, Shiuh-Pyng Shieh, Guofei Gu, and Giuseppe Ateniese, eds.), ACM, 2020, pp. 6-19.

Alexandru Radovici, Ioana Culic, Daniel Rosner, and Flavia Oprea, A Model for the Remote Deployment, update, and safe recovery for commercial sensor-based IoT systems, Sensors 20 (2020), No. 16, pp. 1-34.

Meng Xu, Manuel Huber, Zhichuang Sun, Paul England, Marcus Peinado, Sangho Lee, Andrey Marochko, Dennis Mattoon, Rob Spiger, and Stefan Thom, Dominance as a new trusted computing primitive for the internet of things, 2019 IEEE Symposium on Security and Privacy, SP 2019, San Francisco, CA, USA, May 19-23, 2019, IEEE, 2019, pp. 1415-1430.

Medwed, Marcel et al.; "Cyber Resilience for Self-Monitoring IoT Devices"; 2021 IEEE International Conference on Cyber Security and Resilience (CSR); Jul. 26-28, 2021, Rhodes, Greece; DOI: 10.1109/CSR51186.2021.9527995.

* cited by examiner

APPARATUSES AND METHODS WITH SECURE CONFIGURATION UPDATE

OVERVIEW

Aspects of various embodiments are directed to and/or involve use of updatable recovery as implemented in circuit-based logic devices such as (but not necessarily limited to) circuit-based logic devices having tightly-integrated chip sets with access to an external network for external reconfiguration (e.g., code to configure logic arrays and CPU-directed programming code) of such devices to prevent or at least mitigate attacks or other undesirable modifications.

Internet of Things (IoT), smartcards, video-based surveillance devices, tracking devices and motion detectors are just a few of many different examples of systems having tightly-integrated chip sets with circuit-based logic devices which may be subjected to such undesirable modifications. In recent years, these and other systems are being designed with increased levels and amounts of intelligent logic circuitry and at least portions of this circuitry are coupled to pathways through which operational aspects of the systems may be altered in an undesirable manner.

Using the IoT type device as an example, complexities on IoT devices have been expanded so as to enable a plethora of intercoupled devices to support seemingly-unlimited new functionalities. Due to their quantity and widespread uses, management over many IoT devices is practicably performed by the device providing access to itself through an internal port. As a common example, such access is provided through a broadband network (e.g., the Internet). Such access permits for management processes including, among others, the deployment of over-the-air (OTA) updates which may occur, for example, to minimize or reduce risk of malfunction and/or the capability to execute remote commands on each IoT device.

Unfortunately, there have been increased numbers and types of unintended alterations of the circuits which operate the functionality of these devices and, whether intended by malicious parties or deemed inadvertent incidents, such unintended alterations are commonly referred to as "attacks", For example, such attacks may include an attack on any of a variety of different types of writeable memory circuits on the (e.g., IoT) device such as random access memory (RAM) which oftentimes includes the devices communication stack for receiving and sending information over a broadband network, the network between a communication stack and a remote server, non-volatile (NV) memory on the IoT device, and infrastructure related to (or components) of the IoT device itself (e.g., power supply, interface(s), etc.). Accordingly, it is important, that such devices and systems have in place implementations that protect themselves from such attacks while ensuring updates over a connection between a remote device and the device or system.

These and other matters have presented challenges to integrated-circuit implementations, for a variety of circuit-based applications.

SUMMARY

Various example embodiments are directed to issues such as those addressed above and/or others which may become apparent from the following disclosure concerning securely updating configurations (e.g., code) as may be used in logic devices such as CPU-based and other configurable logic-based integrated circuits.

In connection with one specific type of example, aspects of the present disclosure involve secure updates for an integrated circuit by way of circuit arrangements and/or methods of using such circuit arrangements. More specifically for this particular example: an application circuit accesses an external network while a (non-volatile) configuration/program memory is write protected; and a reset-boot circuit resets and boots the application circuit while access to the external network is disabled, and causes an update for the application circuit. In response to an indication that an update is downloaded for installation, the downloaded update is installed in the memory while access to the external network is disabled, and execution of the reset mode is permitted after the update is installed. Also, a retrieval module may download, in response to an indication that an update is not downloaded, an update provided via the external network while the recovery memory is write-protected and thereby permitting execution of the reset mode after the update is downloaded. In a more-specific example, the relevant memory circuitry may include one memory with a first section for the recovery memory and a second section for the update provided via the external network, and in other more-specific examples, two separate memory circuits may be respectively used for the recovery memory and the update provided via the external network (e.g., internal and external memory circuits, or two internal memory circuits).

More specific examples, which build on one or more of the above aspects, may include one or more of: a normal integrated-circuit (IC) scenario, a special (aka golden scenario), an SBL-type example (where SBL refers to secondary-boot loader), and a scenario involving a combination of two related aspects. Exemplary aspects of the normal scenario may involve both external and internal memory circuits, with the former having a resilient recovery image and being controlled using a Xecute-Only-Memory ("XOM" for execute-only memory) mode which allows fetching access but not read-and/or-write access, in combination with a write-protection mode. The internal memory circuit has a first use-case region with a use-case image containing code for functional operation of the IC and has a second use-case region with a use-case image containing code for functional operation of the IC, the first and second use-case regions may be operably controlled by using a write-lock mode and the XOM mode. The resilient recovery image is updated through use of an algorithm that includes operations of booting, downloading and validating, and rebooting.

The special (or golden) scenario, which may be similar in many regards to the normal IC scenario, is qualified in that the use-case image contains code for functional operation of the IC and in the second use-case region is a copy of the resilient recovery image.

In the specific example referred to as a combination scenario, the nonvolatile memory circuit includes an internal (e.g., flash) memory circuit having a first use-case region with a use-case image containing code for functional operation of the IC and having a resilient recovery image, and further includes a second use-case region also having a use-case image containing code for functional operation of the IC and having a resilient recovery image, the first and second use-case regions may be operably controlled by using a write-lock mode and a (e.g., XOM) mode which allows fetching access but not read-and/or-write access, in combination with a write-protection mode.

The last type of above-mentioned example, the SBL scenario, involves an internal flash memory circuit includes an SBL region having an SBL which is combinable with a recent copy of the resilient recovery image.

In other specific example embodiments (which may also relate to and/or build on the above aspects): the nonvolatile memory circuit may include an external memory circuit situated external to the IC, including a resilient recovery image, and controlled by using a first mode which allows fetching access but not read-and/or-write access, in combination with a second, write-protection mode; the nonvolatile memory circuit may include an internal flash memory circuit, as part of the IC, including a first use-case region having a use-case image containing code for functional operation of the IC and including a second use-case region having a use-case image containing code for functional operation of the IC, the first and second use-case regions being operably controlled by using a write-lock mode; and at least one of the internal and external memory circuits, which refers to or includes a flash-type memory, and the use-case image containing code for functional operation of the IC and in the second use-case region is a copy of the resilient recovery image.

In certain of the above aspects and in other examples, a type of image operating as a resilient-recovery image is used, for example, in addition to a situation in which there may be A/B use-case-images. This resilient-recovery image can be booted to connect to a remote update service, which enables remotely re-flashing a compromised device. To protect the image from attackers, flash features may be used to control the write access during operation. In effect, this image has to be as secure as the root-of-trust of the device. Various more-specific examples are used to provide descriptions of how such an image can be added to different flash scenarios, and how to protect, use and update the image for each use case.

The above discussion/summary is not intended to describe each embodiment or every implementation of the present disclosure. The figures and detailed description that follow also exemplify various embodiments.

BRIEF DESCRIPTION OF FIGURES

Various example embodiments may be more completely understood in consideration of the following detailed description in connection with the accompanying drawings, in which.

Figure 1:
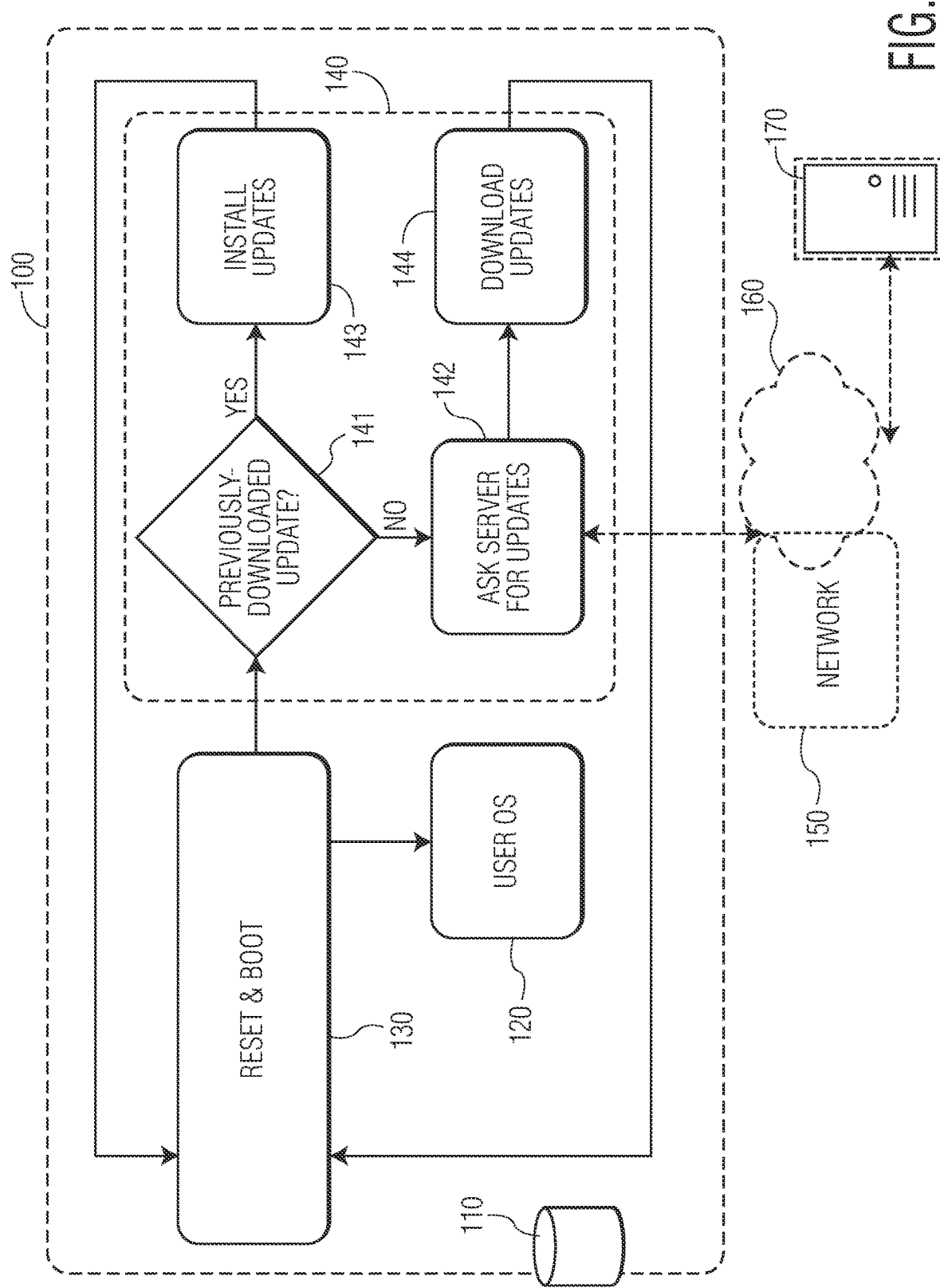
FIG. 1 is a system-level diagram illustrating exemplary circuitry and boot flow, in accordance with the present disclosure.

While various embodiments discussed herein are amenable to modifications and alternative forms, aspects thereof have been shown by way of example in the drawings and will be described in detail. It should be understood, however, that the intention is not to limit the disclosure to the particular embodiments described. On the contrary, the intention is to cover all modifications, equivalents, and alternatives falling within the scope of the disclosure including aspects defined in the claims. In addition, the term "example" as used throughout this application is only by way of illustration, and not limitation.

DETAILED DESCRIPTION

Aspects of the present disclosure are believed to be applicable to a variety of different types of apparatuses, systems and methods involving tightly-integrated-circuit chip sets (IoT devices, smart cards, chip sets used in user equipment, etc.) with access to an external network for external reconfiguration of such circuits (e.g., code to configure logic arrays and CPU-directed programming code) wherein such circuitry may be susceptible to attacks or other undesirable modifications. While not necessarily so limited, various aspects may be appreciated through the following discussion of non-limiting examples which use exemplary contexts.

Accordingly, in the following description various specific details are set forth to describe specific examples presented herein. It should be apparent to one skilled in the art, however, that one or more other examples and/or variations of these examples may be practiced without all the specific details given below. In other instances, well known features have not been described in detail so as not to obscure the description of the examples herein. For ease of illustration, the same reference numerals may be used in different diagrams to refer to the same elements or additional instances of the same element. Also, although aspects and features may in some cases be described in individual figures, it will be appreciated that features from one figure or embodiment can be combined with features of another figure or embodiment even though the combination is not explicitly shown or explicitly described as a combination.

While many different types of examples applicable to providing secure updates for an IC should be apparent from the present disclosure, certain specific embodiments are discussed below to facilitate a working understanding. A first general example type involves a ((non-volatile) memory, and an application circuit (e.g., an operating or other system) which is executed to perform a certain set of activities according to a current configuration or programming as may be stored in the memory, a reset-boot circuit, and a retrieval module. One or more of these above-noted circuits and/or modules may be part of an IC (e.g., chip set, system-on-chip or SoC, single chip), wherein access to the IC may be achieved by way of an external network.

An exemplary arrangement or system of such circuits, as an integrated circuit 100, is shown in FIG. 1, where certain of these above-identified circuits are illustrated. Accordingly, FIG. 1 shows an IC including a memory 110, an application circuit (depicted as a user OS) 120, a reset-boot circuit 130, and a recovery circuit 140 (which may also be considered an update retrieval module for retrieving an update either remotely or locally). A local update retrieval may occur if an update has been previously retrieved but not yet installed. In contrast, a remote update retrieval may occur if an update has not been previously retrieved and an alert or notification is received that an update should be installed (externally-provided notification that an update is available, an error generated within or outside the system and requiring or indicating an update, etc.). The system of FIG. 1 further shows a network 150 and the Cloud (or the Internet) 160 through which a remote device (CPU-based server) 170 may access the system.

In this first general example type, the application circuit 120 may access such an external network 150 (e.g., by checking if an update is already downloaded and if not asking the server 170 for an update as at 141 and 142) while the memory 110 is write protected. The reset-boot circuit 130 resets and boots the application circuit while access to the external network 150 is disabled, and causes an update for the application circuit. In response to an indication at 141 that an update is downloaded for installation, the downloaded update is installed in the memory as at 143 while access to the external network is disabled, and execution of the reset mode is permitted after the update is installed. Also, the retrieval module may download, as at 144 and in response to an indication that an update is not downloaded, an update provided via the external network while the memory is write-protected and thereby permitting execution of the reset mode after the update is downloaded.

Figure 2:
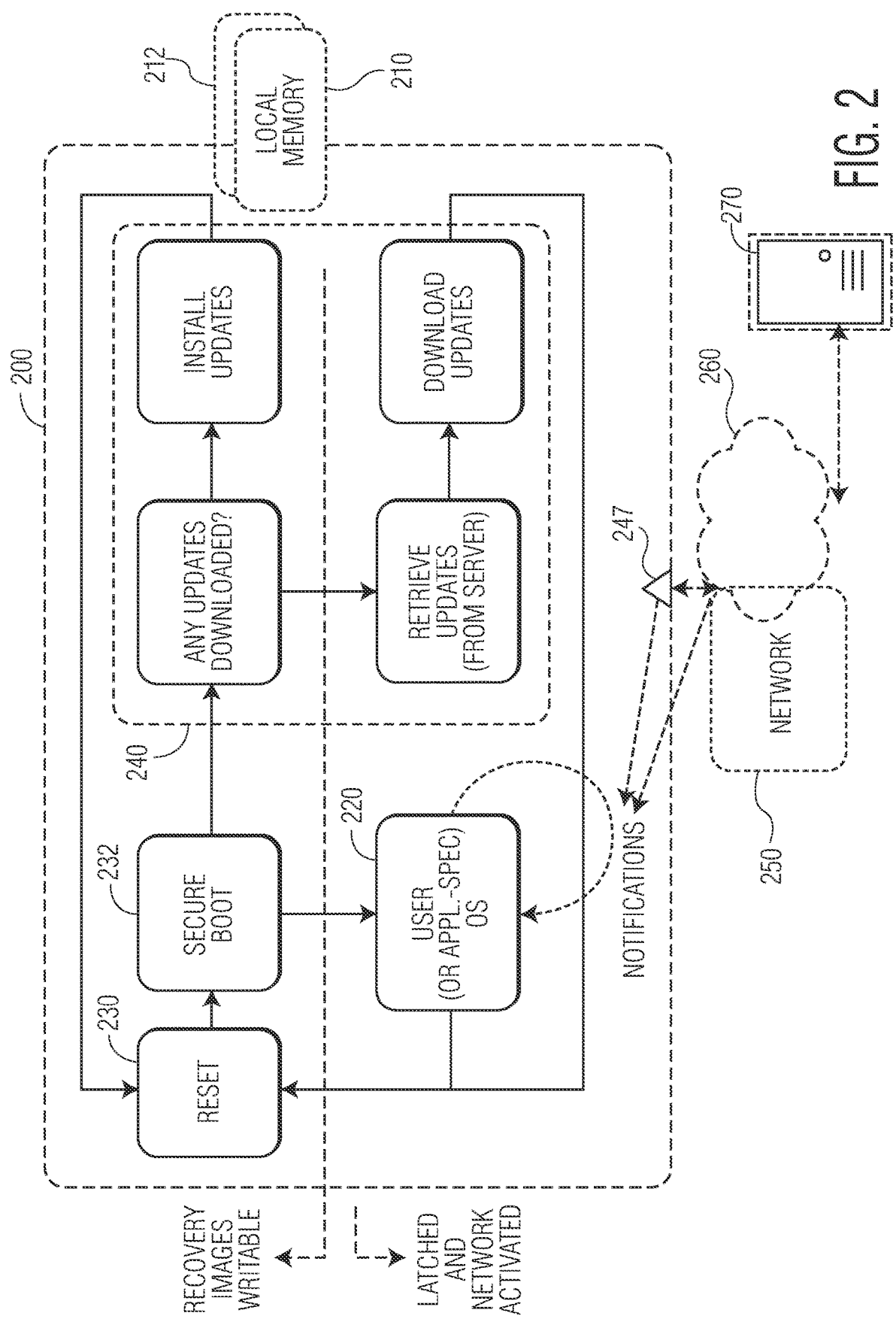
FIG. 2 is a system-level diagram illustrating alternative exemplary circuitry and boot flow, in accordance with the present disclosure.

Also in accordance with the present disclosure, FIG. 2 provides another arrangement of circuits or IC 200 which is similar to that shown in FIG. 1 but with some differences. For instance, in FIG. 2, there is a horizontal dashed line to indicate certain permissible functionality. Above the dashed line the depicted circuit blocks (or modules) are operable while recovery images are writable to the memory. In contrast, for the depicted circuit blocks (or modules) below the dashed line any updates to the memory are blocked (the memory is latched) and the network is activated. Such a differentiation may also be applied similarly to the arrangement of FIG. 1.

Also, in FIG. 2 such alerts or notifications are shown by way of data-flow arrows to depict how an application circuit 220 may receive or self-generate the alerts or notifications. It is appreciated that such alerts or notifications may also be generated by different circuits (not illustrated) within or external to the system. FIG. 2 also shows two memory devices 210 and 212 which may both be used internal, or external, to the system of circuits as illustrated in FIG. 2, or may be used with one being internal and another being external to the system of circuits as illustrated in FIG. 2. Another difference illustrated through FIG. 1 and FIG. 2 is the reset-boot circuit (130 of FIG. 1) being shown as two separate circuits or circuit-based modules 230 and 232 (as may be more typically referred to when one circuit is programmed modularly with respect reset and boot functions). Further, FIG. 2 shows the IC 200 having an access port 247 which may be used as a separate (and/or a network-type) communication link for remote accesses between the IC 200 and an external circuit (not shown). Otherwise, the reference numerals used in FIG. 1 track with those used in FIG. 2 (150 with 250, 160 with 260, 170 with 270, etc.).

A more specific example, which may build on aspects such as those addressed above (and therefore may use similar terminology for referring to similar of the same circuits and/or modules) includes a more-normal IC scenario. In this particular normal-scenario example, an external memory circuit has a resilient recovery image and is controlled by using a "XOM" mode which allows fetching access but not read-and/or-write access, in combination with a write-protection mode. An internal memory circuit (such as a flash memory internal to the IC) has a first use-case region with a use-case image containing code for functional operation of the IC and has a second use-case region with a use-case image containing code for functional operation of the IC, the first and second use-case regions may be operably controlled by using a write-lock mode and the XOM mode. The resilient recovery image is updated through use of a process that includes operations of booting, downloading and validating, and rebooting.

More specifically, an example process for updating the resilient recovery image may involve: booting the resilient recovery image from the external memory circuit while the external memory circuit is in the write-protection state and while access to the external network data-access circuit is enabled, downloading and validating the update as an update resilient recovery image to the second use-case region, and rebooting into the update resilient recovery image while the external memory circuit is not in the write-protection state and while access to the external network data-access circuit is disabled and, based on whether the reboot is deemed successful, install the update resilient recovery image as a replacement for the resilient recovery image in the external memory circuit or reboot into the resilient recovery image in the external memory circuit to permit for another attempt in updating the resilient recovery image.

According to more specific aspects: the reset-and-boot circuit is to disable the write-protection state (e.g., by initiating a reset mode) and in response to a reset action by the reset-and-boot circuit, the write-protection state is no longer disabled; the circuit-based install module is further to conduct an internal check as to whether the update is already downloaded for installation; and while the downloaded update is installed in the nonvolatile memory circuit, the reset-and-boot circuit is prevented from causing the write-protection state to be disabled. Further, the circuit-based retrieval module may enable access to external data (e.g., via communications circuitry and a network port to enable the apparatus to communicate over a network such as a private network, the Internet or another broadband network) and then request an update from an external server and, in response to a communication from the external server, download the update provided via the external data-access circuit.

Special (or golden) type example scenario. Another more specific example, which may also build on aspects such as those addressed above (e.g., similar to the normal IC scenario), may be referred to as a special (or golden) scenario. In this so-called special-scenario example, the use-case image, which contains code for functional operation of the IC in the second use-case region, is a copy of the resilient recovery image.

Combination-type example scenario. Another more specific example is referred to herein as a combination scenario. In this combination-scenario type of example, the nonvolatile memory circuit includes an internal (e.g., flash) memory circuit, which may be part of the IC and which has a first use-case region with a use-case image containing code for functional operation of the IC and has a resilient recovery image. The memory further includes a second use-case region also having a use-case image containing code for functional operation of the IC and has a resilient recovery image, the first and second use-case regions may be operably controlled by using a write-lock mode and a (e.g., XOM) mode which allows fetching access but not read-and/or-write access, in combination with a write-protection mode. The resilient recovery image is updated by tracking versions of the use-case image containing code for functional operation of the IC and having a resilient recovery image in each of the first and second use-case regions.

SBL-type example scenario. Yet another more specific example is referred to herein as an SBL-type example and, as indicated by way of the acronym, involves an internal flash memory circuit that includes an SBL region with an SBL which is combinable with a recent copy of the resilient recovery image. The SBL-type example may also involve an application-specific circuit, a reset-and-boot circuit and a recovery circuit, all of which may form a part of an IC. The nonvolatile memory circuit may include an external flash memory circuit (situated external to the integrated circuit) which has a resilient recovery image and which is controlled by using a XOM mode which allows fetching access but not read-and/or-write access, in combination with a write-protection mode. An internal flash memory circuit, as part of the IC, may include an SBL region having an SBL which is combinable with a recent copy of the resilient recovery image, having a first use-case region, and may also include a second use-case region, with the SBL region and the first and second use-case regions to be operably controlled by using a write-lock mode and the XOM mode. The resilient recovery image may be updated by: booting the resilient recovery image from a copy in the first use-case region of the internal flash memory circuit while the nonvolatile memory circuit is in the write-protection state and while access to the external network data-access circuit is enabled, downloading and validating the update as an update resilient recovery image to the external flash memory circuit, rebooting into the update resilient recovery image while the nonvolatile memory circuit is not in the write-protection state and while access to the external network data-access circuit is disabled and, based on whether the reboot is deemed successful, install the update resilient recovery image as a replacement first use-case region of the internal flash memory circuit and reboot into the resilient recovery image in the external flash memory circuit to permit for another attempt in updating the resilient recovery image.

More detailed discussion of the present disclosure is provided in connection with the above and further examples in which images are stored in a memory (e.g., flash) for one or more product types (e.g., IoT, SoC) and for the memory to be booted. In such examples and including but not limited to the above first general type case and the more particular example types (e.g., more normal-type, special-type, combination-type and SBL-type scenarios), a distinction may be made between internal-type and external-type memory devices (in many examples, the term flash memory is used for discussion purposes and as may be applicable for certain contexts). Where the internal-type is often smaller and more secure, the external-type often has a larger storage capacity but with less security (e.g., referring to access control mechanisms, which are easier to realize for internal flash-type memories). For external flash memories (or "devices"), the circuits often require to build a hardware block which supports multiple or often many flash manufacturers and to adapt the access control for many corner technology cases/protocols. In contrast, access control for internal flash memory typically requires support for only one technology.

Exemplary image types. Certain example systems discussed herein include one or more of the following image types: (a) usecase image (aka "use-case image) which contains the code for the device's functionality; (b) recovery-image which refers to a local recovery image, that is booted if the usecase image(s) cannot be booted (it provides the interface for restoring the device locally, e.g., through serial download; (c) SBL (the secondary bootloader, e.g., U-Boot, if available) runs after the initial boot stage, wherein the SBL loads and boots the images for the next boot stage as may be applicable for operating systems (OS) and various end-use-specific applications; (d) in connection with some scenarios, the device is equipped with a so-called golden image to which a device can fall back after a functional error or a compromise, whereby this enables functionality restoration without manual intervention if the use-case-image has been compromised (often, the golden image may not be updatable); and (e) update-image which contains a newer version of some of the installed images of device, and may be downloaded to the flash memory, staged for installation, and then installed to the correct location.

While systems using these different image types are described herein, implementation details may vary from system to system. Depending on the particular implementation, a system can have multiple versions of the same image type (e.g., "Image A" and "Image B", which may be used in "A/B" update schemes). In such update schemes, initially only one of the image slots (A or B) is updated. After this new image has been installed and validated, it is then copied to the complementary slot. This may be useful, for example, because it increases robustness of the system; for example, a failed update does not result in a "bricked" device as there is always one valid image to fall back to. If there are multiple images with different versions, the boot flow checks the versions of the duplicate images and first tries to boot the most recent image. In general, the boot flow starts in the first phase by executing ROM (read-only memory) code as detailed further for each scenario discussed herein.

In the immediately-following discussion of more-particular examples, three image scenarios (normal, SBL, and golden) are discussed for a device such as an IC with both internal and external flash as shown in connection with FIGS. 1 and 2 and with the following corresponding subsections. Furthermore, it is assumed that the device has an enabled "secure boot" feature.

Figure 3A:
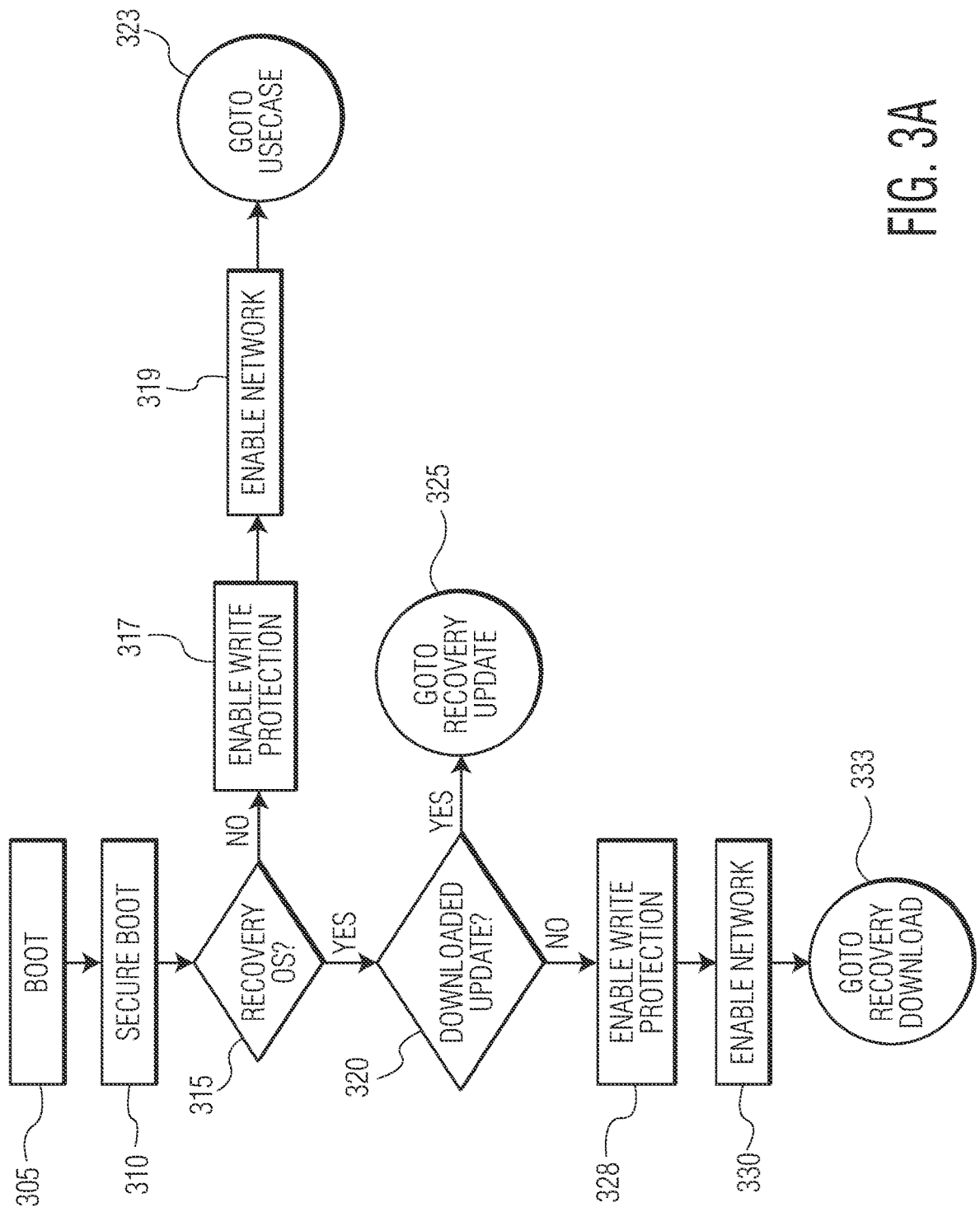
FIGS. 3A and 3B form a flow chart illustrating an exemplary set of activities and/or data flow for a system of the type implemented in a manner consistent with FIG. 1 and/or FIG. 2, in accordance with the present disclosure.
Figure 3B:
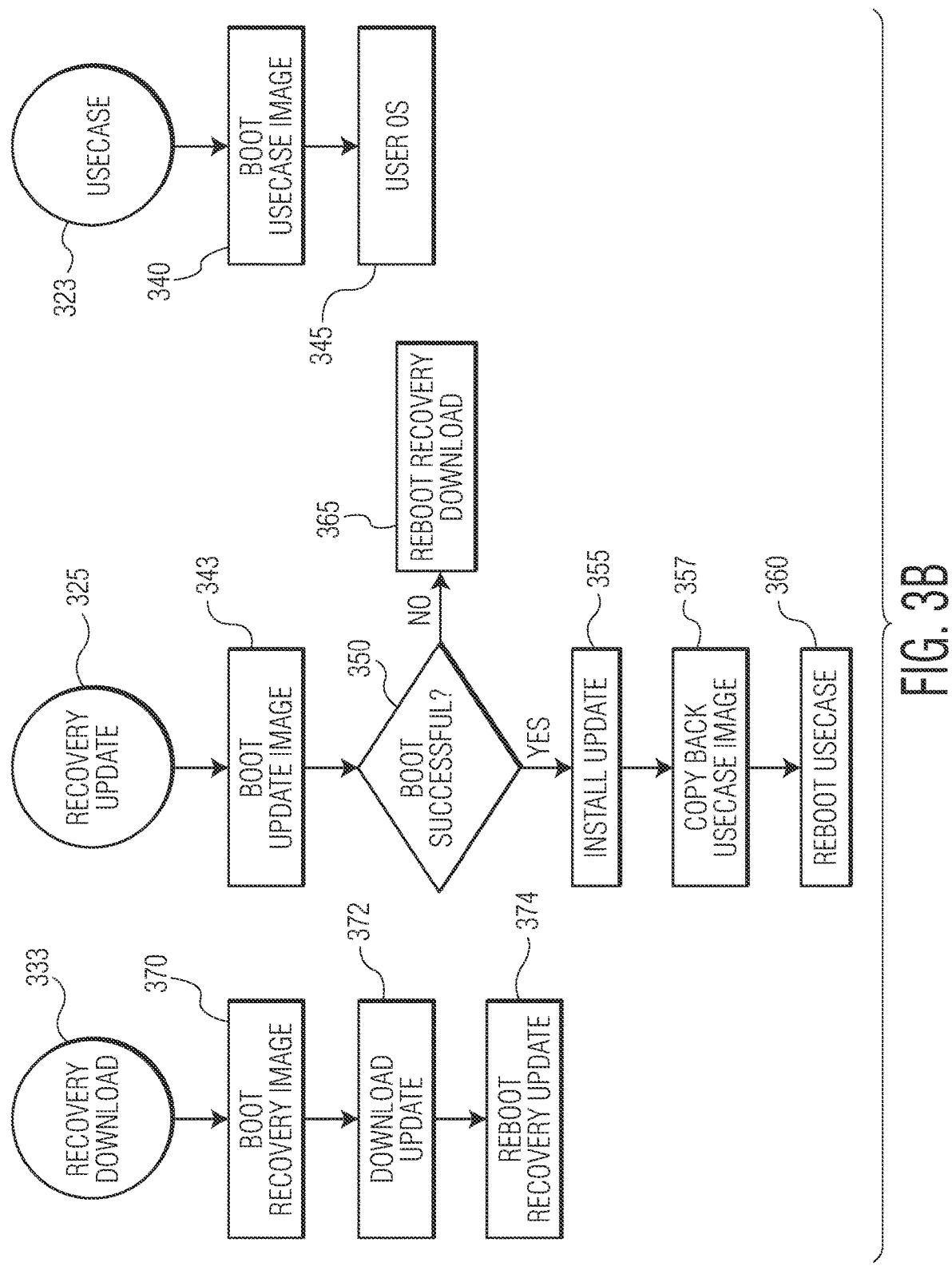

In connection with the type of scenario which is referred to above as more normal, FIGS. 3A and 3B illustrate a manner in which the system of FIG. 2 (or FIG. 1) may be carry out a set of exemplary steps. This operational flow may be carried out by a logic circuit or module which may be, for example, part of the OS or in another (non-illustrated) circuit but also part of the system. Starting with block 305 of FIG. 3A, the system is notified that a boot action should occur and flow proceeds to block 310 where the system is to implement a secure boot. In this first boot stage, ROM code (in ROM not specifically shown in FIG. 2) compares the version information of usecase-image A and usecase-image B and identifies the most recent download update for trying the secure boot (block 315) for recovering the OS. If this try fails, flow proceeds from block 315 to block 317 where the system enables write protection (block 317) to protect the resilient-recovery image and then enables the network at block 319. From block 319, flow proceeds to block 323 (as discussed below with FIG. 3B).

If, however, recovery of the OS is successful, flow proceeds from block 315 to block 320 where the system queries whether an update has been downloaded. If an update has been downloaded, flow proceeds to block 325 (as discussed below with FIG. 3B). If an update has not been downloaded, flow proceeds from block 320 to block 328 where the system enables write protection to protect the resilient-recovery image and then enables the network at block 330. From block 330, flow proceeds to block 333 of FIG. 3A.

FIG. 3B shows each of the aforementioned blocks 323, 325 and 333 being replicated from FIG. 3A. Reconnecting these figures first at block 333, the system attempts to boot the usecase image for a successful recovery of the OS, as at block 335.

From block 333 of FIG. 3B with the recovery circuit having retrieved the update, flow proceeds to block 370 where the system boots the recovery image, then downloads the update at block 372, and reboots the recovery update at block 374.

From block 323 of FIG. 3B and with the OS being successfully booted, flow proceeds to block 340 where the recovery circuit of FIG. 2 is to download an update via the enabled network (e.g., from an external CPU or server 270 of FIG. 2). From block 340, flow proceeds to block 345 where the system reboots the update retrieved and saved in memory by the recovery circuit.

From block 325 of FIG. 3B and with an update already having been downloaded, flow proceeds to block 343 where the system boots using the update (or resilient-recovery image) as previously obtained by the recovery circuit. If the boot of the update image is successful, flow proceeds to block 350 to ascertain if the boot is successful. If so, from block 350 flow proceeds to block 355 where the system installs the previously-obtained update and copies back the usecase image (block 357) and then proceeds to block 360 where the system reboots into the update. If the boot of the update image at block 350 is not successful, flow proceeds to block 365 where the system reboots into a downloaded image obtained by the recovery circuit.

In the event that none of the usecase images can be booted, the bootloader in ROM falls back to the Recovery-Image stored on the external flash device. To enable robust update mechanisms, the downloaded update image may be stored initially in another image slot. In this type of instance, the update image may be first validated before installing it into the less recent usecase-image slot. However, if the external flash is not sufficiently large for both image types, the device can only support either local recovery or robust updates. The flash devices in this scenario may be structured as follows: Internal Flash with usecase-image A, and with usecase-image B; and External Flash with recovery-image and/or update-image (e.g., as staged).

For the SBL scenario, in contrast to the Normal scenario, the boot flow includes a secondary boot stage. To this end, a customer-developed SBL image may be placed in the internal flash along the two above-characterized usecase-Images. The boot behavior is similar to the previous scenario, only that now the ROM bootloader starts the SBL which is then tasked with selecting the right image for the next stage. The flash devices in this scenario are structured with the internal flash having the SBL, usecase-image A, and usecase-image B, and with the external flash having the recovery-image and/or the update-image (as staged).

In the golden scenario, there may be only one usecase image and the secondary slot on the internal flash is typically filled with a golden-image. For processing, the ROM bootloader first tries to boot the usecase image, and falls back to the golden-image if it fails. The flash devices in this scenario may be structured as follows: internal flash with usecase image, and golden-image, and external flash with the update-image (staged).

Certain of the examples discussed in the present disclosure are to protect such a resilient-recovery image from unauthorized access. According to certain aspects, this may be achieved (depending on the security features available on the included memory or flash device) in different ways. The following provides an exemplary (non-exhaustive) list of flash features offered by certain products including current-available IoT (Internet-of-Things) and SoC type devices. The first flash feature is address remapping. The address remapping feature enables efficient dual image boot scenarios, and this may be achieved by allowing remapping of a window region (based address+length) to offset zero, or by allowing a fixed logical address range to be mapped to any flash window.

A second flash feature is write lock. This feature permits the customer to define and write-lock regions (base address+ length) of the flash device. There are two types of write locks: soft and hard locks. For the former, flash region (base address+length) is write-protected, but the base address and length registers are modifiable just before the lock. For the latter, both the flash region (base address+length) and the configuration register (containing base address & length registers) are write-locked.

A third such feature is flash hiding. This feature allows customers to specify a range (base address+length) which will be hidden from the address map once enabled until the next restart.

Yet another flash feature, referred to as XOM, can be tied together with a memory-encryption feature. Any plain data read or write operation targeting a section marked as XOM returns an error code. Only instruction fetch operations are allowed to access this section, for example, if coupled with encryption, the flash word is decrypted for the instruction fetch and returned to the core.

As may be apparent and depending on the specific system implementation, certain of the above-described aspects of the present disclosure may be advantageous in other ways. In certain of the scenarios such as discussed in the previous section, if the images in flash are compromised by an attacker, there is a high probability that the device is bricked or requires local intervention. For example, if the internal flash is overwritten while the external flash is still intact, the local recovery image can be used to manually restore the device. However, if both the internal and external flash are compromised, the device might not be recoverable even with physical intervention. A well-protected golden image might be able to resolve this in some attack cases, but it can be also overwritten by the attacker. By using aspects according to the present disclosure, resilient remote recovery is allowed even in cases where the attacker has taken control over both internal and external flash devices. Furthermore, such aspects of the present disclosure are shown as being robustly updatable, which is often not the case even for golden images.

In one exemplary context which is particularly useful for discussion purposes, certain aspects of the present disclosure are directed to use of a resilient-recovery image into an IoT device. In one such recovery process according to the present disclosure, booting the resilient-recovery image starts a so-called recovery OS (operating system or application-specific circuit) which has, among other tasks, a primary task of checking (remotely) for updates and installing them according to a particular process, as detailed herein. In this way, the IoT device can return to a functional state without manual intervention, even if all usecase images have been compromised. It may be desirable that the recovery OS provides only these two functionalities in order to have as much as possible reduced attack surface. In this context the recovery OS is very different form the user OS and applications. For many implementations, the resilient-recovery image has special protection from being overwritten by an attacker. To this end, it is assumed that the image is write-protected during normal operation such as during the execution of usecase image. In particular, the write-protection is enabled during a trusted phase of secure boot, such as by ROM code, and can only be disabled through a complete reset of the device. This write-protection may be implemented in practice in different ways and depending, for example, on the type of flash scenario as exemplified below. To be able to update the resilient-recovery image, it is necessary to follow a specific update process to ensure the recovery ability of the device. If the write-protection was disabled during download of an update in the recovery OS, an attacker could compromise the recovery OS over the network connection and overwrite the resilient-recovery image. Therefore, network and resilient-recovery image access may be split over two different boot phases, e.g., one such approach is depicted in FIG. 1. In this exemplary flow, the resilient recovery image is always booted with write protection and network access disabled. The device then checks, if there is a downloaded update image available for installation. If there is an image to install, it proceeds to install the update. If there is no such image on the device, it enables write protection before enabling the network access. Afterwards, the devices checks with the remote server, to verify if there are any updates to download. The exact implementation of the update protocol depends on the use case and device requirements.

In the following paragraphs, an alternative update procedure is described. In the first phase of this procedure, a secure boot enables write-protection of the resilient-recovery image before booting the recovery OS and enabling any network connection. The OS then checks remotely, if there are any updates of the resilient-recovery image available. If so, it downloads the image and stores it in an accessible region of flash for later validation. Now, the OS cannot directly install the image, as the write-protection mechanism is active. Therefore, it reboots after finishing the download of the new image.

In the second phase, secure boot does not enable the write-protection, but instead boots the recovery OS without network access. The OS then checks if an update of the resilient-recovery image was staged in flash. If so, it validates and installs the image. Note that this assumes that the recovery OS has a hardened parser and installation routine to prevent compromise through a malicious update image. After the installation finishes, the OS reboots the device again. The recovery procedure can be slightly modified as follows: During secure boot, first a scratchpad value is checked. If it indicates recovery, the code branches to the first recovery stage (instead of going to normal boot when the scratchpad is set to the default value) with write-protection enabled. Next, the network access is enabled. Afterwards, the recovery OS downloads the new image and writes a value into scratchpad, indicating that the first recovery stage is done. Then, the SoC is reset. Again, during secure boot the scratchpad value is checked and the second stage of the recovery is started. At this stage, the network is kept off-line and the write-protection is not enabled, since the recovery OS has to install the new image. When this is complete, the scratchpad value is cleared and the SoC is reset. Since the scratchpad is now set to the default value, the device boots into normal mode. Note that this does not conflict with established update mechanisms for any of the other image types. In normal operation, i.e., no compromise, they can be updated through their established channels without the device having to enter recovery OS. Only in case the device cannot be booted anymore normally, the recovery OS is entered and used to update the compromised images.

An exemplary manner in which the resilient-recovery image (e.g., denoted as resilient-recovery-image in the flash structure) is now described. The resilient-recovery image can be integrated into the common more-specific flash scenarios introduced supra. Furthermore, an additional scenario is provided with optimal security, assuming the possibility for combined images. A combined image occupies one image slot in the flash device, but consists of two images of distinct types. To protect the resilient-recovery image, three of the four features (as previously introduced) may be used. In particular, the approaches may use write lock, XOM (allows only fetching, but not read or write access), and address remapping.

In certain of the example cases, the normal update of the usecase image is trivial, except for the scenario with the golden-image. In contrast, the update of the resilient recovery-image is oftentimes non-trivial, except for the last optimal cases relying on combined images. For the descriptions of the update schemes, one may assume that the A image denotes the ones with the most recent version. Each of the four scenarios represents a different use case and together they cover the common applications. For each of them, a resilient-recovery image can be added, protected, and securely updated. Which of the four is chosen in practice, depends on the customer requirements and the sizes of both the flash devices and the images. The protection and update of "standard" images (as opposed to a resilient-recovery-image as stored in the flash) is not impacted by the exemplary approaches of the present disclosure, and device users (e.g., user of the IoT devices) may use their own update mechanisms for updating their "standard" images.

As the resilient-recovery-image resides in external flash, it relies on the availability of security features in the external flash device. Overall, for the external flash a write-protection mechanism is used in combination with the XOM feature. For the internal flash, in addition one region to write-lock and one region for XOM are used. Note that a version control of usecase image and resilient-recovery-image may be decoupled, since it is expected that usecase image will be updated more frequently. The flash devices in this scenario are structured with the internal flash: having usecase-image A and having usecase-image B, and the external flash having the resilient-recovery-image or the update-image (as staged).

To update the resilient-recovery-image, the following may be used as an example flow process. First, the resilient-recovery-image (with write-protection and network access enabled) is booted from the external flash device. Second, the new Update-Image is downloaded and validated for the resilient-recovery-image to the slot of usecase-image B on the internal flash. Third, the system reboots into the update-image (with write-protection and network access disabled) for the resilient-recovery-image. If this boot goes well, the system installs the update-image in the slot of resilient-recovery-image on the external flash. If this boot does not implement successfully, the system reboots into the resilient-recovery-image on the external flash and the flow starts from the beginning. Finally, usecase-image A is copied to the slot of usecase-image B, and reboot into normal functionality.

There are some variations of this setup, depending on the requirements of the system. Keeping two instances of usecase image allows for more efficient and robust updates for this image type during normal operation. However, this means that there is only one instance of the resilient-recovery-image during this time. While it cannot be corrupted by the attacker, it can still be compromised by a physical defect, e.g., flash aging. In this case, the device loses its remote recovery ability. To make the system more resilient against this threat, the usecase-image B should be replaced by a second instance of the resilient-recovery-image. While this results in slower updates for the usecase image in normal mode (as it needs to go through the resilient-recovery-image every time), the device can still be remotely recovered even if one of the resilient-recovery-images is corrupted. For improved robustness, it might be required to perform another validation step before copying usecase-image A to the slot of usecase-image B, i.e., deleting the validated copy of the resilient-recovery-image. For example, if the copying to the external flash fails, the device could be left without any functional recovery image. Therefore, an additional boot cycle is added into the update procedure for such cases. In particular, after copying to the external flash, the new resilient-recovery-image is booted to verify that the copying process was successful. Only after a successful boot is the usecase-image A copied to the slot of usecase-image B. The external write protection is used to protect the resilient-recovery-image. With the additional validation of the flash copy procedure as described in the previous paragraph, solutions according to the present disclosure also use an internal write protection to protect the Update-Image of the resilient-recovery-image.

Reference is now made to an exemplary SBL Scenario. Without combined images, the SBL scenario can be implemented analogous to the Normal scenario. The same security mechanisms as the Normal scenario may be called for or required, i.e., for the external flash a write-protection mechanism in combination with the XOM feature, and for the internal flash one region to write-lock and one region for XOM. Again the version control of usecase image and resilient-recovery-image is decoupled, since it is expected that usecase image will be updated more frequently. However, if a resilient-recovery-image can be combined with the SBL in one slot, it is possible to create a more efficient and secure solution. The flash devices in this scenario are structured as follows with Internal Flash having SBL (+optionally resilient-recovery-image A), usecase-image A and usecase-image B; and with External Flash having resilient-recovery-image (B) or Update-Image (staged). To update the resilient-recovery-image assuming an A/B scheme, the following exemplary flow may be used: i) Boot the resilient-recovery-image A (with write-protection and network access) from the internal flash device; ii) Download and validate the new Update-Image for the resilient-recovery-image to the slot of resilient-recovery-image B on the external flash; iii) Reboot into the Update-Image (without write-protection and network access) for the resilient-recovery-image; iv) Depending on if this boot goes well: if yes, install the Update-Image in the slot of resilient-recovery-image A on the internal flash, and reboot; if no, reboot into resilient-recovery-image A on the internal flash and start the flow from the beginning. Again, there are variants of this setup depending on the requirements of the target system. The flow described above assumes the existence of an external flash device. However, it is possible to instantiate this setup with only an internal flash device. In that case, the flash consists of an SBL with either two usecase image and one resilient-recovery-Image, or one usecase image and two resilient-recovery-images.

In this so-called golden scenario, the fallback of the usecase image is the Golden-Image, which is also used to update it. Again for the external flash a write-protection mechanism is used in combination with the XOM feature, and for the internal flash one region to write-lock and one region for XOM. As for the other cases, the version control of usecase image and resilient-recovery-image is decoupled, since it is expected that usecase image will be updated more frequently. The golden image is turned into a resilient-recovery image, by including such aspects in the original image. In this way, the scenario becomes very similar to an earlier example, the one with two resilient-recovery-images. The update procedure for the resilient-recovery-image may be the same in both cases. The flash devices in this scenario are structured as follows: Internal Flash with the usecase image and with Golden-Image; and the external flash with the resilient-recovery-image or update image (staged).

For the combined A/B scenario, the internal flash is large enough to store two combined images, each consisting of one usecase-image and one resilient-recovery-image. In effect, there is an A/B scheme for both image types on the internal flash. This has the advantage that the device does not require an external flash and that the update mechanisms of both image types are efficient and robust. However, it implies that the usecase image and the resilient-recovery-image share the same versioning as they are part of the same combined image. The solution uses one region to be write locked and one XOM for the internal flash. It is also possible to replace the write lock by simply flash hiding the memory region. The update procedure is the same for both resilient-recovery and the normal images. For this scenario, the internal flash includes the usecase-image A+the resilient-recovery-image A and includes usecase-image B+resilient-recovery-image B.

Certain aspects of the present disclosure, for example as may be applicable to IoT devices and can be used in types of IoT devices with internal and external flash devices. For example, this includes the more concrete product types such as characterized by Nirvana, Redfinch, Niobe4_mini and Niobe4_analog. In connection with these and other implementations and/or applications, aspects of the present disclosure involve: an resilient-image update procedure that is dedicated and exclusively used for the recovery image; particular aspects that may provide specific benefit to IoT-type devices and/or IoT-type SoC's and their specific image structures of internal and external flash devices, and with particular algorithms on how such a recovery image can be updated; examples of secure methods to update the back-up program to protect against active attackers in real time; and examples of specific applications and related benefits to devices where the nonvolatile memory is internal to the microcontroller and the non-volatile memory is involved in recovery actions with direct involvement of the microcontroller (as opposed, for example, to a remotely-situated CPU or server performing recovery actions via a local network or portal-type access). Regarding more detailed aspects and implementations which may be combined with aspects of the instant disclosure (e.g., involving such a remotely-situated CPU or server, use of a rich-execution environment (REE circuit) and related circuit-based modules (or blocks) for processing updates and reasons for seeking an update such as due to a notification, anomaly, virus, etc.), reference may be made to the disclosure of the discussion and exemplary illustrations of FIGS. 2 through 7 of U.S. Pub. No. 2021/0133362, U.S. patent application Ser. No. 17/081,589, filed Oct. 27, 2020, which is herein incorporated by reference generally and for these specifically-identified aspects.

Terms to exemplify orientation, such as upper/lower, left/right, top/bottom and above/below in the figures, may be used herein to refer to relative positions of elements as shown in the figures. It should be understood that the terminology is used for notational convenience only and that in actual use the disclosed structures may be oriented different from the orientation shown in the figures. Thus, the terms should not be construed in a limiting manner.

Also, the Specification describes and/or illustrates aspects useful for implementing the claimed disclosure by way of various circuits or circuitry which may be illustrated as or using terms such as blocks, modules, device, system, and/or other circuit-type depictions (e.g., as in each of the figures FIGS.). Such circuits or circuitry are used together with other elements to exemplify how certain embodiments may be carried out in the form or structures, steps, functions, operations, activities, etc. As examples, wherein such circuits or circuitry may correspond to logic circuitry (which may refer to or include a code-programmed/configured CPU), in one example the logic circuitry may carry out a process or method (sometimes "algorithm") by performing a certain first activity and a certain second activity, and in another example, the logic circuitry may carry out a process or method by performing these same activities/operations in part (individually or combination with other aspects) and/or collectively to form an overall process.

For example, in certain of the above-discussed embodiments, one or more modules are discrete logic circuits or programmable logic circuits configured and arranged for implementing these operations/activities, as may be carried out in the approaches shown in FIGS. 1 and 2, or by way of one or more of the example flows depicted in the flow chart of FIGS. 3A and 3B. In certain embodiments, such a programmable circuit is one or more computer circuits, including memory circuitry for storing and accessing a program to be executed as a set (or sets) of instructions (and/or to be used as configuration data to define how the programmable circuit is to perform), and various algorithms or processes as described in the summary, in describing various examples in the written description and/or in connection with FIGS. 3A and 3B. Such a program may be set to carry out a process (of one or more steps) as may be implemented, for example, by any of a variety of programmable-circuit types to perform such step(s), operation(s), etc. Depending on the application, the instructions (and/or configuration data) can be configured for implementation in logic circuitry, with the instructions (whether characterized in the form of object code, firmware or software) stored in and accessible from a memory (circuit); as an example, a non-transient computer storage medium (e.g., non-volatile memory circuit) which may contain instructions to be executed by a computer processor for carrying out a process such as various ones of the above-described set of steps.

As another example, where the Specification may make reference to a "first [type of structure]", a "second [type of structure]", etc., where the [type of structure] might be replaced with terms such as ["circuit", "circuitry" and others], the adjectives "first" and "second" are not used to connote any description of the structure or to provide any substantive meaning; rather, such adjectives are merely used for English-language antecedence to differentiate one such similarly-named structure from another similarly-named structure (e.g., "first circuit configured to convert . . ." is interpreted as "circuit configured to convert . . .").

Based upon the above discussion and illustrations, those skilled in the art will readily recognize that various modifications and changes may be made to the various embodiments without strictly following the exemplary embodiments and applications illustrated and described herein. For example, methods as exemplified in the Figures may involve steps carried out in various orders, with one or more aspects of the embodiments herein retained, or may involve fewer or more steps. Such modifications do not depart from the true spirit and scope of various aspects of the disclosure, including aspects set forth in the claims.

What is claimed is:

1. An apparatus comprising:
an application-specific circuit to receive, while a nonvolatile memory circuit which has a programmed configuration is in a write-protection state and while access to an external network data-access circuit is enabled, an indication that an update corresponding to a change in the configuration is appropriate;
a reset-and-boot circuit to, in response to the indication, execute reset and boot the application-specific circuit while access to an external network data-access circuit is disabled, and, in response to the indication, to cause the application-specific circuit to operate consistent with an updated configuration which overrides the configuration previously programmed into the nonvolatile memory circuit;
a recovery circuit including
a circuit-based install module to cause, in response to an indication that an update is downloaded for installation, the downloaded update to be installed in the nonvolatile memory circuit while access to the external network data-access circuit is disabled, and to permit execution of the reset mode after the update is installed, and
a circuit-based retrieval module to download, in response to an indication that an update is not downloaded for installation, an update provided via the external network data-access circuit while the nonvolatile memory circuit is in the write-protection state, and to permit execution of the reset mode after the update is downloaded.

2. The apparatus of claim 1, wherein the reset-and-boot circuit is further to disable the write-protection state and, in response to a reset action by the reset-and-boot circuit, the write-protection state is no longer enabled.

3. The apparatus of claim 1, wherein the reset-and-boot circuit is to remove the nonvolatile memory circuit from the write-protection state by initiating a reset mode for the apparatus, and wherein, while the downloaded update is installed in the nonvolatile memory circuit.

4. The apparatus of claim 1, wherein the circuit-based install module is further to conduct an internal check on whether the update is already downloaded for installation.

5. The apparatus of claim 1, wherein the circuit-based retrieval module is further to enable access to external data and then to request an update from an external server and, in response to a communication from the external server, download the update provided via the external network data-access circuit.

6. The apparatus of claim 1, wherein the nonvolatile memory circuit further includes a flash memory circuit, and wherein programmed configuration includes a resilient recovery image.

7. The apparatus of claim 1, further including a system-on-chip (SoC) circuit including the application-specific circuit, the reset-and-boot circuit and the recovery circuit.

8. The apparatus of claim 1, further including at least one Internet of Thing (IoT) device including circuitry to enable the IoT device to communicate over a broadband network.

9. The apparatus of claim 1, further including communications circuitry to enable the apparatus device to communicate over a network.

10. The apparatus of claim 1, further including an integrated circuit of which the application-specific circuit, the reset-and-boot circuit and the recovery circuit form a part, wherein the nonvolatile memory circuit includes
an external memory circuit situated external to the integrated circuit, including a resilient recovery image, and controlled by using a XOM mode which allows fetching access but not read-and/or-write access, in combination with a write-protection mode, and
an internal memory circuit, as part of the integrated circuit, including a first use-case region having a use-case image containing code for functional operation of the IC and including a second use-case region having a use-case image containing code for functional operation of the IC, the first and second use-case regions to be operably controlled by using a write-lock mode and the XOM mode,
wherein the resilient recovery image is updated by:

booting the resilient recovery image from the external memory circuit while the external memory circuit is in the write-protection state and while access to the external network data-access circuit is enabled, downloading and validating the update as an update resilient recovery image to the second use-case region, and rebooting into the update resilient recovery image while the external memory circuit is not in the write-protection state and while access to the external network data-access circuit is disabled and, based on whether the reboot is deemed successful, install the update resilient recovery image as a replacement for the resilient recovery image in the external memory circuit or reboot into the resilient recovery image in the external memory circuit to permit for another attempt in updating the resilient recovery image.

11. The apparatus of claim 10, wherein the integrated circuit is to transfer, in response to the reboot being deemed successful, a copy of the use-case image from the first use-case region to the second use-case region.

12. The apparatus of claim 10, wherein the use-case image containing code for functional operation of the IC in the second use-case region is a copy of the resilient recovery image.

13. The apparatus of claim 1, further including an integrated circuit (IC) of which the application-specific circuit, the reset-and-boot circuit and the recovery circuit form a part, wherein the nonvolatile memory circuit includes an internal flash memory circuit as part of the integrated circuit, and the internal flash memory circuit including a first use-case region having a use-case image containing code for functional operation of the IC and having a resilient recovery image, and including a second use-case region also having a use-case image containing code for functional operation of the IC and having a resilient recovery image, the first and second use-case regions to be operably controlled by using a write-lock mode and an XOM mode which allows fetching access but not read-and/or-write access, in combination with a write-protection mode, wherein the resilient recovery image is updated by tracking versions of the use-case image containing code for functional operation of the IC and having a resilient recovery image in each of the first and second use-case regions.

14. The apparatus of claim 1, further including an integrated circuit of which the application-specific circuit, the reset-and-boot circuit and the recovery circuit form a part, wherein the nonvolatile memory circuit includes an external flash memory circuit situated external to the integrated circuit, including a resilient recovery image, and controlled by using a XOM mode which allows fetching access but not read-and/or-write access, in combination with a write-protection mode, and an internal flash memory circuit, as part of the integrated circuit, including an SBL (secondary bootloader) region having an SBL which is combinable with a recent copy of the resilient recovery image, having a first use-case region, and including a second use-case region, the SBL region and the first and second use-case regions being operably controllable by using a write-lock mode and the XOM mode, wherein the resilient recovery image is updated by:

booting the resilient recovery image from a copy in the first use-case region of the internal flash memory circuit while the nonvolatile memory circuit is in the write-protection state and while access to the external network data-access circuit is enabled, downloading and validating the update as an update resilient recovery image to the external flash memory circuit, and rebooting into the update resilient recovery image while the nonvolatile memory circuit is not in the write-protection state and while access to the external network data-access circuit is disabled and, based on whether the reboot is deemed successful, install the update resilient recovery image as a replacement first use-case region of the internal flash memory circuit and, if there is an indication of a failed update, reboot into the resilient recovery image in the external flash memory circuit to permit for another attempt in updating the resilient recovery image.

15. A method comprising:

storing a programmed configuration in a nonvolatile memory circuit of an integrated circuit;

operating an application-specific circuit, while the nonvolatile memory circuit is in a write-protection state and while access to an external network data-access circuit is enabled, consistent with the configuration programmed into the nonvolatile memory circuit and receive an indication that an update corresponding to a change in the configuration is appropriate;

executing a reset-and-boot circuit to, in response to the indication, execute reset and boot the application-specific circuit while access to an external network data-access circuit is disabled, and in response to the indication, to cause the application-specific circuit to operate consistent with an updated configuration which overrides the configuration previously programmed into the nonvolatile memory circuit; via a recovery circuit, causing, in response to an indication that an update is downloaded for installation, the downloaded update to be installed in the nonvolatile memory circuit while access to the external network data-access circuit is disabled, and to permit execution of the reset mode after the update is installed, and downloading, in response to an indication that an update is not downloaded for installation, an update provided via the external network data-access circuit while the nonvolatile memory circuit is in the write-protection state, and thereby permitting execution of the reset mode after the update is downloaded.

16. The method of claim 15, wherein the nonvolatile memory circuit includes an external memory circuit situated external to the integrated circuit, including a resilient recovery image, and controlled by using a first mode which allows fetching access but not read-and/or-write access, in combination with a second, write-protection mode.

17. The method of claim 16, wherein the nonvolatile memory circuit includes an internal memory circuit, as part of the integrated circuit, including a first use-case region having a use-case image containing code for functional operation of the IC and including a second use-case region having a use-case image containing code for functional operation of the IC, the first and second use-case regions to be operably controlled by using a write-lock mode.

18. The method of claim 17, wherein at least one of the internal memory circuit and the external memory circuit is a flash-type memory circuit, and the use-case image containing code for functional operation of the IC in the second use-case region is a copy of the resilient recovery image.

19. The method of claim 15, wherein the method further comprises removing the nonvolatile memory circuit from the write protection state by initiating a reset mode.

20. A non-transient computer storage medium containing instructions to be executed by a computer processor for carrying out a method including a set of steps comprising:
storing a programmed configuration in a nonvolatile memory circuit of an integrated circuit;
operating an application-specific circuit, while the nonvolatile memory circuit is in a write-protection state and while access to an external network data-access circuit is enabled, consistent with the configuration programmed into the nonvolatile memory circuit and receive an indication that an update corresponding to a change in the configuration is appropriate;
executing a reset-and-boot circuit to, in response to the indication, execute reset and boot the application-specific circuit while access to an external network data-access circuit is disabled, and, in response to the indication, to cause the application-specific circuit to operate consistent with an updated configuration which overrides the configuration previously programmed into the nonvolatile memory circuit;
via a recovery circuit,
causing, in response to an indication that an update is downloaded for installation, the downloaded update to be installed in the nonvolatile memory circuit while access to the external network data-access circuit is disabled, and to permit execution of the reset mode after the update is installed, and
downloading, in response to an indication that an update is not downloaded for installation, an update provided via the external network data-access circuit while the nonvolatile memory circuit is in the write-protection state, and thereby permitting execution of the reset mode after the update is downloaded.

* * * * *